Nov. 15, 1949 C. W. MAYNE 2,488,215
VAPOR DISCHARGING FRYING PAN COVER
Filed Jan. 3, 1946

INVENTOR
Charles W. Mayne
BY
John Powers,
ATTORNEY

Patented Nov. 15, 1949

2,488,215

UNITED STATES PATENT OFFICE 2,488,215

VAPOR DISCHARGING FRYING PAN COVER

Charles W. Mayne, Buffalo, N. Y.

Application January 3, 1946, Serial No. 638,860

1 Claim. (Cl. 126—383)

This invention relates to an improvement in devices for preventing the spattering of grease in connection with the use of frying pans. As a matter of brevity and convenience the device may be designated as a frying pan cover.

The object of the invention is to provide a simple and economical frying pan cover which, as formed to prevent the spattering of grease, will reduce the accumulation of moisture within the cover to a negligible degree and substantially eliminate the deposit of moisture in the frying pan; which, as positioned for use, will provide for inspection of the contents of the frying pan and for easy and open access thereto for the removal of articles of food; and which will be adaptable to frying pans of different diameters.

Figure 3:
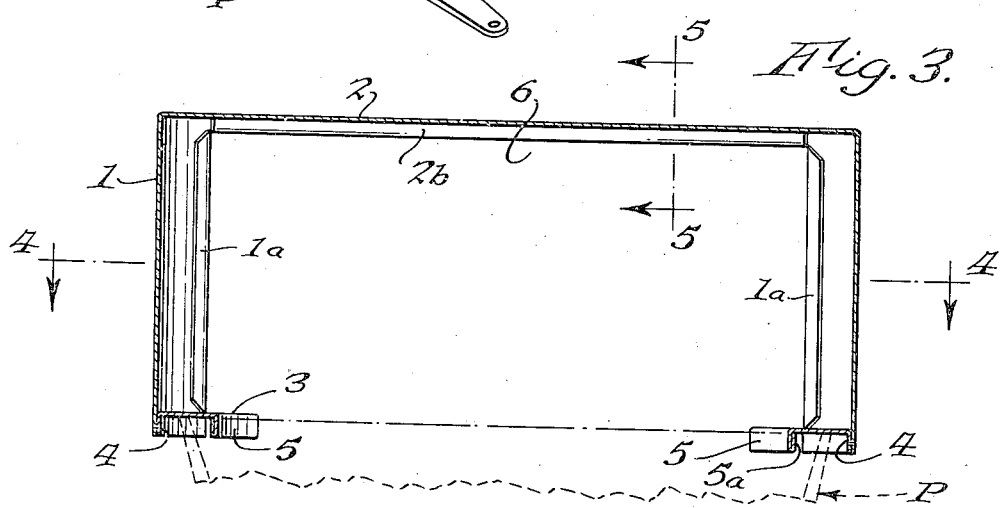
Figure 3 is a cross sectional view in the plane 3—3 of Figure 1.
Figure 4:
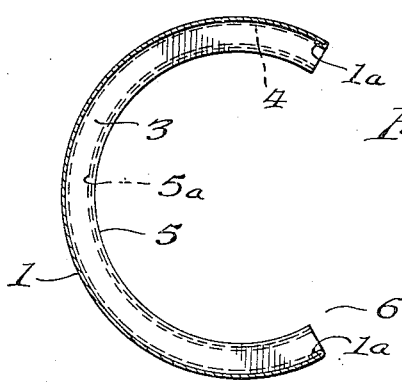
Figure 5:

Figures 4 and 5 are detail cross sectional views upon the respective lines 4—4 and 5—5 of Figure 3.

The cover includes a vertical wall 1 of circular curvature but of less than circular extent, the wall 1 extending through an arc of approximately 240°. At its upper end the wall 1 carries a flat disc shaped top plate 2, the wall and the top plate being preferably integral. At its lower end and adjacent its inner surface the wall 1 carries a seating element 3 having curvature and extent conforming to the wall 1. The element 3 extends inwardly from the wall 1 in a plane normal to the vertical and is preferably formed along its respective outer and inner edge with downwardly extending flanges 4 and 5. When the cover is made of metal, as shown, the flange 4 is attached to the wall 1, preferably by welding. The element 3 engages upon the upper edge of the frying pan P and thereby provides for the support of the cover by the pan, the cover being freely removable or replaceable. The width of the element 3 is such that the cover may be used with frying pans varying in diameter within the range of frying pan sizes used in the ordinary household kitchen; and either of the flanges 4 and 5 will prevent displacement of the cover from the frying pan by a movement in a lateral direction.

Figure 1:
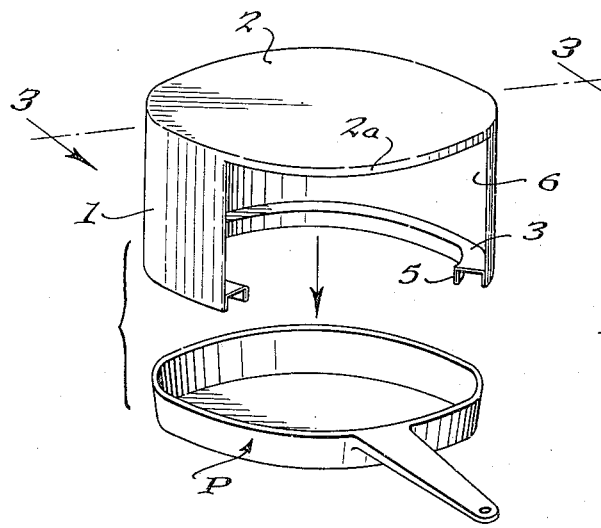
Figure 1 is a front perspective view of a frying pan cover embodying my invention, the cover being shown in the relation which it has as it is moved into position upon the frying pan, which is also shown in perspective.
Figure 2:
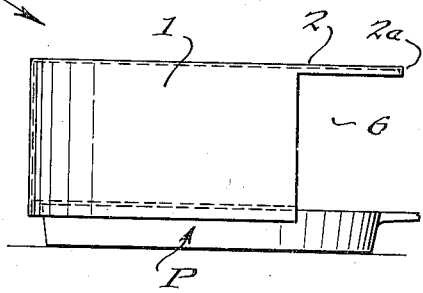
Figure 2 is a side elevation showing the cover upon the frying pan.

The front vertical edges of the wall 1 and the top plate 2 delimit an opening 6 at the front of the cover. This opening is of such size as to provide for the free and immediate escape of substantially all water vapors whereby the water condensation upon the inner surfaces of the cover is limited to a minimum and negligible degree. The size of the opening 6 is also such as to provide for the inspection of the contents of the frying pan and their convenient removal from the pan, without the necessity of removing the cover. The top plate 2, being of full circular extent, overhangs the opening 6, as shown in Figure 2, thereby to limit the amount of spatter which can escape through the opening 6 to a negligible degree. Since important objects of the invention are substantially to prevent the accumulation of water vapors within the cover and to provide for their escape in maximum degree, it is important that the elevation of the flat top plate 2 be such that it combines the following operative characteristics, viz, (1) that it will be heated to an extent such that it will not substantially condense water vapors; (2) that it will enable the opening 6 to be of adequate compass for the immediate discharge of substantially all of the water vapors, for the inspection of the food while it is being cooked and for the removal of the food from the frying pan; and (3) that it will substantially intercept the spatter of grease. The elevation of the flat top plate 2 above the frying pan is determined with these purposes in view and is ideally, and as shown, of the order of somewhat more than one-third and somewhat less than one-half of the diameter of the frying pan, such diameter being within the range of the variations of diametrical dimensions of frying pans as made for domestic use.

When the cover is made of metal, as shown, all of its exposed edge portions are preferably formed with overturned flanges which provide reinforcement and also eliminate sharp edges, thereby to promote convenience in handling the cover and in placing it upon or removing it from the pan. Thus the flange 5 is formed with an overturned flange 5a, the front vertical edges of the wall 1 are formed with overturned flanges 1a and the plate 2 throughout the edge thereof which overhangs the opening 6 is formed with a flange 2a having an overturn 2b.

The wall 1 directly prevents the escape of spatter from the sides and the rear of the cover and the top plate 2 directly prevents the escape of spatter from the upper end of the cover. Since most of the spatter is in a general upward direction and since the top plate 2 overhangs the opening 6, providing a roof or canopy which projects outward beyond the edge of the frying pan, the top plate 2 will substantially intercept spatter at the front of the cover, any spatter escaping through the opening 6 being negligible in degree, notwithstanding that this opening is of ample size for the free and immediate escape of vapors, the inspection of the contents of the pan and the removal of such contents without the necessity of removing the cover. Hence the cover protects the wall at the back of the stove from discoloration and the accumulation of grease and in like manner protects the adjacent parts of the stove from the accumulation of grease. Since the top plate 2 prevents the escape of spatter in substantial degree from the opening 6 the cover also protects the cook against spatter, thereby substantially eliminating the hazard of burns and the liability of spotting garments with grease.

The free and immediate escape of vapors through the opening 6 prevents any substantial accumulation of condensed moisture upon the inner surface of the cover. Such moisture as may condense within the cover is in such a small degree that the condensation is not apt to drip back into the frying pan. Any moisture which may accumulate upon the wall 1 and the overturn 2b of the top plate 2 will be beyond the edge of the frying pan and hence will not fall or flow into the pan.

I claim:

A frying pan cover comprising a vertical wall of cylindrical outline and an extent of the order of 240°, said wall terminating in vertical edges and providing an open space between said edges, a flat disc shaped top plate carried by said wall and which overhangs said open space in the manner of a roof or canopy, the wall also being provided at its lower end with a laterally and inwardly projecting seating element in a plane normal to the vertical, said seating element being coextensive with said wall and having a downwardly extending marginal flange conforming in outline to the curvature of said wall, said seating element being engageable as a support upon the upper edge of a frying pan and being of such width as to fit upon frying pans of various diameters as made for domestic use, the said open space being of such size as to provide for the free and immediate escape of substantially all of the water vapors and the inspection and removal of the contents of the frying pan, the cylindrical wall and the top plate preventing the escape of spatter from the frying pan at all points excepting the area of said open space and the part of the top plate which overhangs said open space substantially preventing the escape of spatter through said open space, the flat top plate having an elevation above the frying pan of the order of somewhat more than one-third and somewhat less than one-half of the diameter of the frying pan.

CHARLES W. MAYNE.

REFERENCES CITED

The following references are of record in the file of this patent:

UNITED STATES PATENTS

| Number | Name | Date |
|---|---|---|
| 534,138 | Cleary | Feb. 12, 1895 |
| 671,795 | Foresman | Apr. 9, 1901 |
| 1,627,099 | Landgren et al. | May 3, 1927 |
| 1,722,513 | Witter | July 30, 1929 |